United States Patent [19]

Lapeyre

[11] Patent Number: 4,473,365
[45] Date of Patent: Sep. 25, 1984

[54] DETACHABLE LINK CHAIN

[76] Inventor: James M. Lapeyre, 13 Richmond Pl., New Orleans, La. 70150

[21] Appl. No.: 210,861

[22] Filed: Nov. 26, 1980

[51] Int. Cl.³ .............................................. F16G 15/12
[52] U.S. Cl. .................................... 474/212; 474/242; 59/85; 59/90
[58] Field of Search .................... 59/78, 84, 85, 90; 474/212, 242

[56] References Cited

U.S. PATENT DOCUMENTS

| 62,204 | 2/1867 | Jenks | 59/78 |
| 3,431,724 | 3/1969 | Steuer | 59/90 |
| 3,453,823 | 7/1969 | Mandt | 59/90 |
| 4,050,323 | 9/1977 | l'Anson | 52/90 |

FOREIGN PATENT DOCUMENTS

| 372243 | 11/1963 | Switzerland | 59/90 |
| 14834 | of 1892 | United Kingdom | 59/78 |
| 1391623 | 4/1975 | United Kingdom | 59/90 |

Primary Examiner—Henry E. Raduazo
Attorney, Agent, or Firm—Weingarten, Schurgin, Gagnebin & Hayes

[57] ABSTRACT

A transmission or conveyor chain composed of a plurality of interconnected identical links which are attachable and detachable without need for pivot pins or other separate connecting hardware. Each link is preferably molded as a unitary structure of plastic material.

13 Claims, 22 Drawing Figures

U.S. Patent  Sep. 25, 1984  Sheet 1 of 5  4,473,365
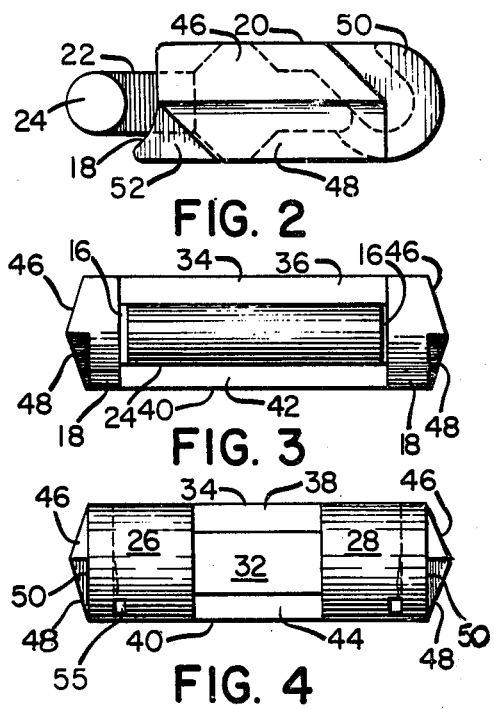
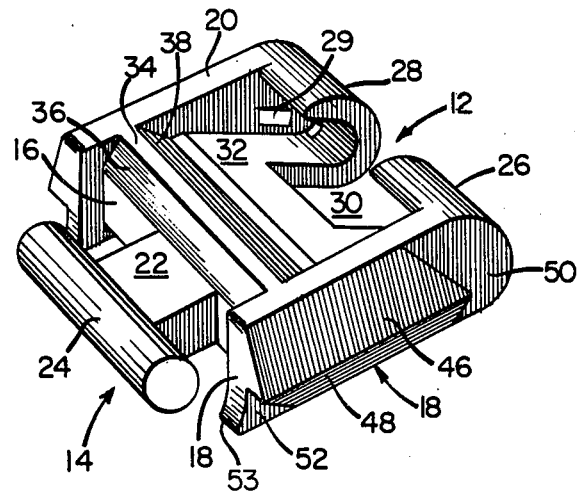
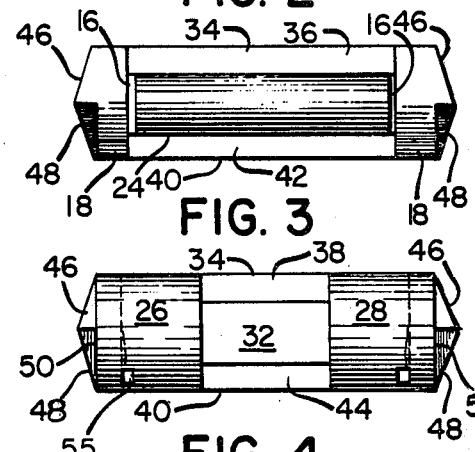
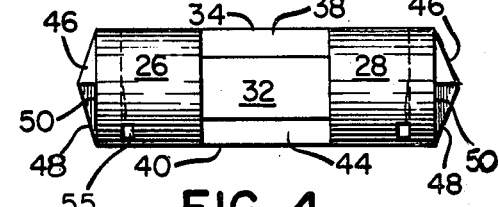
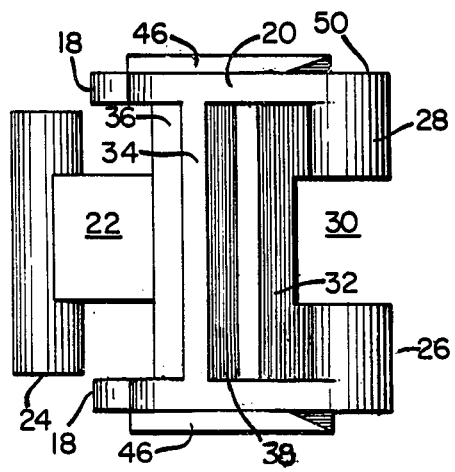
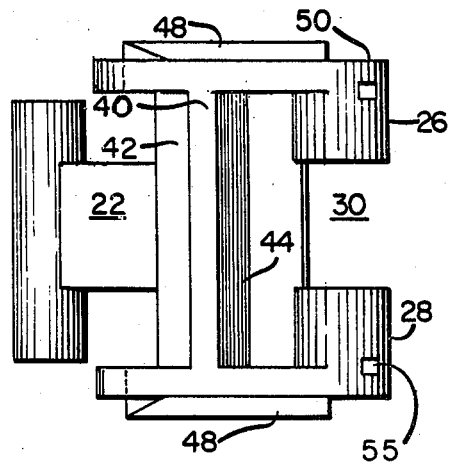
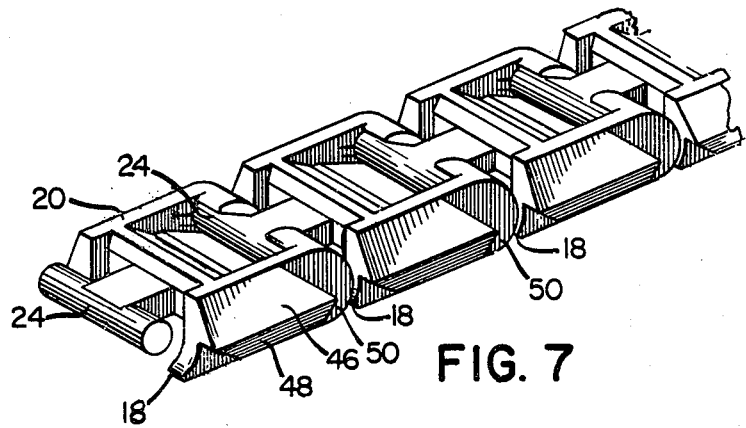

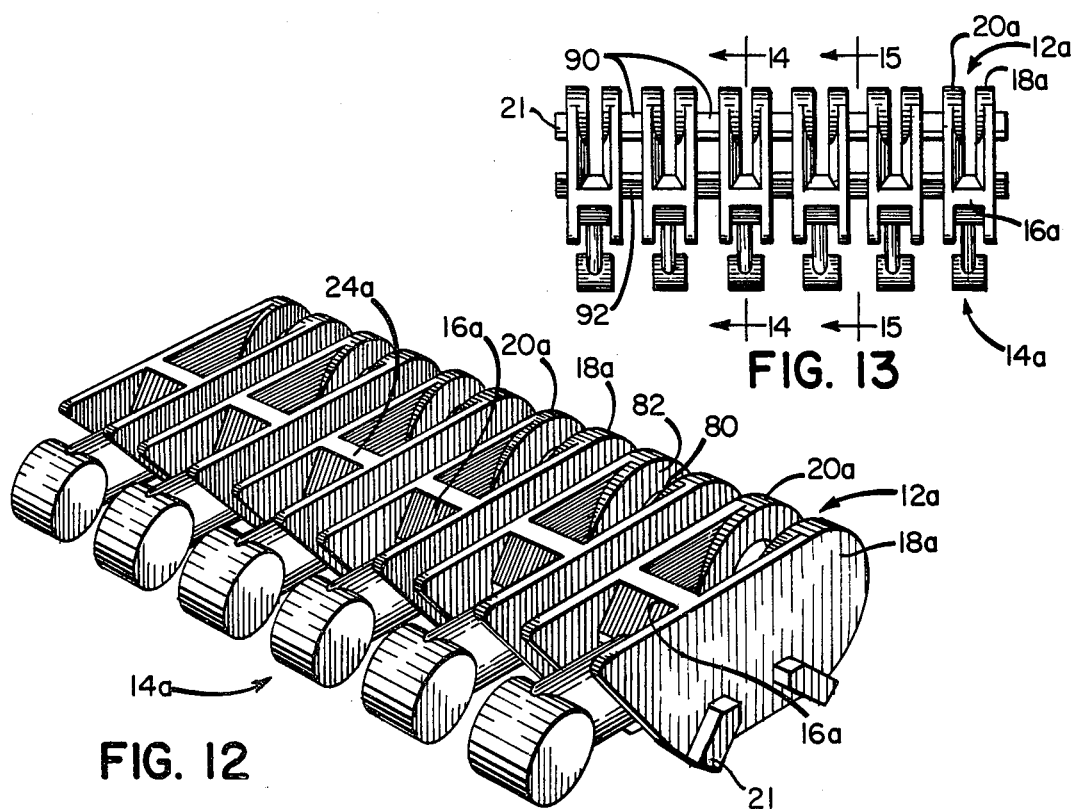
FIG. 13
FIG. 12
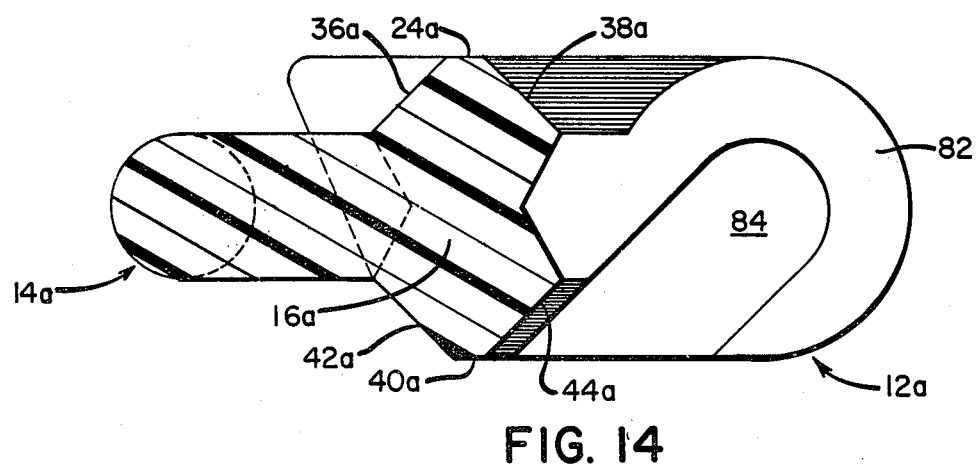
FIG. 14
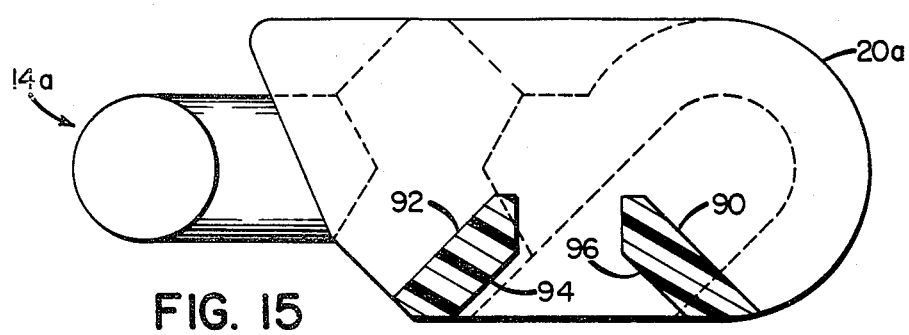
FIG. 15

DETACHABLE LINK CHAIN

FIELD OF THE INVENTION

This invention relates to link structures, and more particularly to a multiple link chain composed of identical detachable links.

BACKGROUND OF THE INVENTION

Various forms of multiple link chains are known and generally include links which are pivotally connected to like links by means of pivot pins to permit relative pivotable movement of adjacent links about the axis of the pivot pin. The chain is usually driven by a sprocket wheel in which sprocket teeth are arranged to engage the link ends through which the pivot pin is disposed for driving of the chain at the link ends.

A novel link chain is described in copending application Ser. No. 013,165, filed Feb. 21, 1979 (and now abandoned), entitled Link Chain Belt in which a driving tooth on each link protrudes therefrom at a position intermediate the pivot axes at the link ends. The location of the driving tooth midway between the pivot axes and the configuration of the driving tooth surfaces, when employed in conjunction with an associated sprocket wheel configuration, exhibits substantially low scrubbing action and small chordal action. Scrubbing action is known in relation to chain belts wherein the link teeth and sprocket teeth engage one another with a scrubbing or rubbing contact. Chordal action in chain drives is also known and comprises a vibratory motion of the chain as it engages the sprocket wheel.

SUMMARY OF THE INVENTION

In brief, the present invention provides a link chain composed of a plurality of interconnected identical links which are attachable and detachable without need for pivot pins or any separate connecting hardware. A center tooth is disposed between the pivot axes of each link, as in the aforesaid copending application, for efficient drive about an associated sprocket wheel with minimal scrubbing and chordal action. Each link includes a link body having respective ends spaced along the longitudinal axis of the link body, with a pivot axis defined at each end and a driving tooth disposed midway between the pivot axes. One end of the link includes oppositely-extending cylindrical posts or rods disposed along a pivot axis which is orthogonal to the longitudinal axis of the link body. The other end of the link includes arcuate receptacle or hook portions which are pivotably attachable to the posts of an adjacent link for pivotable movement of attached links about the pivot axis. The center tooth is engageable with an associated sprocket wheel for driving of the link chain. The sides of each link can include beveled surfaces for mating with a V-pulley such that the link chain can be alternatively driven or guided by a V-pulley rather than, or in addition to, a sprocket wheel. In the preferred embodiment, the links are symmetrical about a central plane extending through the link body such that either the top or bottom of the links can be engaged by a sprocket wheel or a V-pulley. In preferred construction, the links are molded of a suitable plastic material as an integral unitary structure.

The link chain can be used as a transmission chain or as a conveyor chain. As a conveyor, the link can be composed of a plurality of link portions, each substantially as described above, such that the conveyor link has an array of post ends and an array of hook ends which are mateable with like conveyor links. The conveyor links can be fabricated in multiples of a given width so that conveyors can be built up of any intended overall width.

DESCRIPTION OF THE DRAWINGS

The invention will be more fully understood from the following detailed description taken in conjunction with the accompanying drawings, in which:

FIG. 1 is a pictorial view of a link according to the invention;

FIG. 2 is a side elevation view of the link of FIG. 1;

FIG. 3 is an end elevation view of the post end of the link of FIG. 1;

FIG. 4 is an end elevation view of the hook end of the link of FIG. 1;

FIG. 5 is a top view of the link of FIG. 1;

FIG. 6 is a bottom view of the link of FIG. 1;

FIG. 7 is a pictorial view of the interconnected links of FIG. 1 forming a link chain;

FIG. 12 is a pictorial view of a conveyor link according to the invention;

FIG. 13 is a top view of the link of FIG. 12;

FIG. 14 is a sectional view taken along line 14—14 of FIG. 13;

FIG. 15 is a sectional view taken along line 15—15 of FIG. 13;

DETAILED DESCRIPTION OF THE INVENTION

Figure 8:
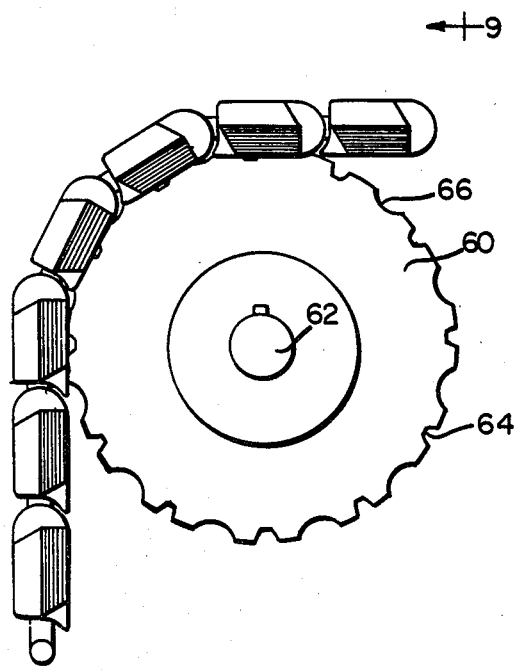
FIG. 8 is an elevation view of the link chain in engagement with a sprocket wheel.

The link chain embodying the invention is composed of interconnected links, each of which is of identical construction and which preferably are of integral molded plastic construction. Each link 10 has a hook end 12 and a post end 14, the post end of each link capable of being interconnected to the hook end of an adjacent link to form a chain of intended length. Each link includes a central portion 16 extending across the width of the link and joining side portions 18 and 20. An arm 22 outwardly extends from central portion 16 beyond the confronting ends of side portions 18 and 20 and to which is affixed a transversely extending post 24 which is of cylindrical cross-section and which has oppositely extending post ends. The hook end 12 of the link includes first and second curved end portions 26 and 28 which are transversely spaced by an intermediate gap 30. The end portions 26 and 28 are joined to respective side portions 18 and 20 and are also joined to central portion 16 by a web 32. The outer surfaces of end portion 26 and 28 are cylindrical as are the inner surfaces of the end portions against which portions of post 24 of an adjacent link is in rotatable engagement when the links are interconnected.

The central portion 16 includes a tooth 34 formed by beveled surfaces 36 and 38. A similar tooth 40 is provided on the opposite surface of the link formed by beveled surfaces 42 and 44. The tooth 34 of each link is in alignment with the tooth 40 of that link, and is symmetrically disposed about a plane extending through the central portion 16 orthogonal to the longitudinal axis of the link. Each side portion 18 and 20 includes beveled surfaces 46 and 48 which form an outwardly extending V-shaped side for mating with a V-pulley which can be employed to drive or guide the interconnected links. The beveled surfaces on each side portion are cut away at the hook end as shown by reference numeral 50 and at the post end as shown by reference numeral 52 such that effectively continuous beveled surfaces are provided for mating with a V-pulley. The extended ends 53 serve as stops to limit the maximum angular movement between adjacent links.

The post 24 of each link is adapted to be disposed and retained within the end portions 26 and 28 of an adjacent link, as illustrated in FIG. 7. The post is retained within the end portions by detent 29, and the post and associated end portions provide a journal bearing for relative rotation between the thus connected links. The openings 55 are mold holes for mold tooling employed in forming the detents in the illustrated embodiment. The tooth 34 and tooth 40 are each disposed midway between the axis of rotation of post 24 and axis of rotation of end portions 26 and 28. The links 10 are symmetrical about a central longitudinal plane such that either the top or bottom of the interconnected links can be driven. The pivot axis of the post end is substantially coincident with the pivot axis of the hook end of a mated link.

Figure 9:
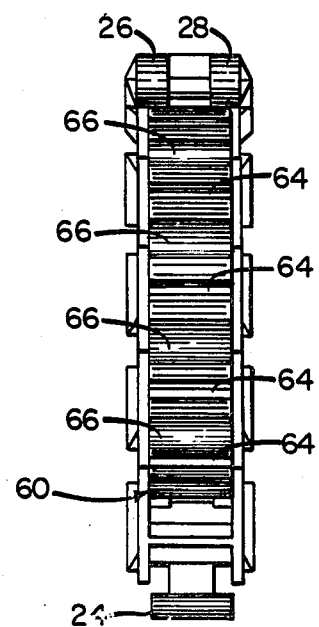
FIG. 9 is an elevation view taken along line 9—9 of FIG. 8.

The chain fomed of interconnected links 10 can be positively driven by an associated sprocket as shown in FIGS. 8 and 9. A sprocket wheel 60 is rotatable on a shaft 62 and includes a plurality of recesses 64 regularly spaced about the periphery of the sprocket wheel and adapted to mate with either tooth 34 or tooth 40, depending on the orientation of the links, for driving of the links of the chain. A curved transverse groove 66 is provided in the periphery of sprocket wheel 60 midway between adjacent sprocket recesses 64 to provide clearance for the pivotably interconnected ends of the links.

Figure 10:
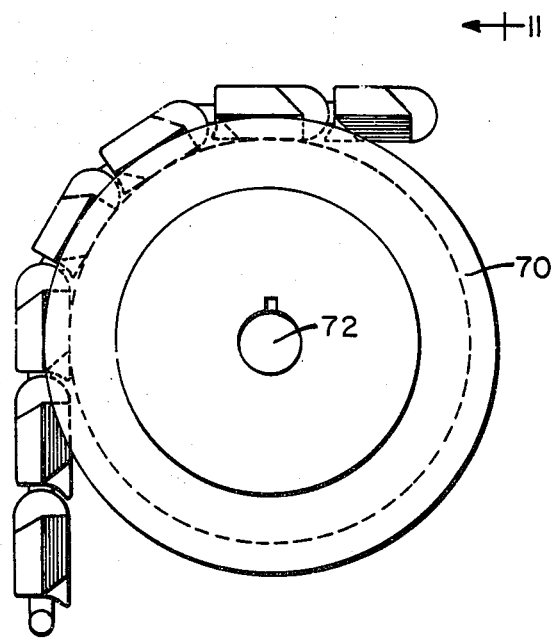
FIG. 10 is an elevation view of the link chain in engagement with a V-pulley.
Figure 11:
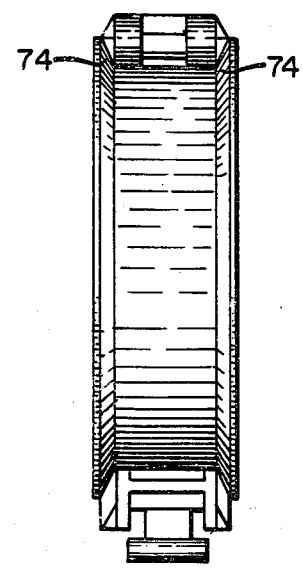
FIG. 11 is an elevation view taken along 11—11 of FIG. 10.

The link chain composed of interconnected links 10 can also be driven by a V-pulley as illustrated in FIGS. 10 and 11. The V-pulley 70 is rotatable on a shaft 72 and includes a peripheral pair of confronting flanges 74 which are outwardly tapered to provide the well known V-pulley configuration. The taper of the V-pulley flanges is adapted to mate with the taper of side surfaces 46 or 48 of links 10.

Figure 16:
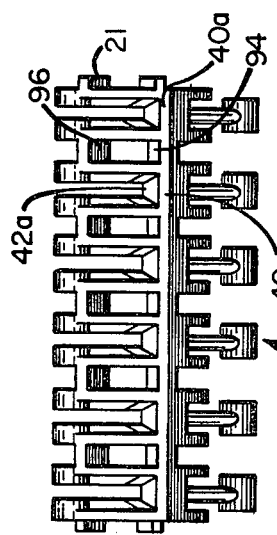
FIG. 16 is a bottom view of the conveyor link of FIGS. 12 and 13.

An embodiment is shown in FIGS. 12-21 which is especially suited to use in a conveyor chain. Referring to FIGS. 12-16, the conveyor link is composed of an array of link portions, each of which is substantially similar to the link described above. Each link portion includes a hook end 12a and a post end 14a, a central portion 16a extending across the width of the link portion and joining side portions 18a and 20a. Each central portion 16a includes a tooth 24a formed by beveled surfaces 36a and 38a. A similar tooth 40a is provided on the opposite surface of the link portion and formed by beveled surfaces 42a and 44a. The teeth 24a and 40a are in alignment such that either the top or bottom of the interconnected links can be driven or mated with an associated sprocket. The hook end includes confronting raised arcuate portions 80 and 82 which define a recess 84 into which the post end of an adjacent link is seated for rotatable engagement about the pivot axis of the mated links. As seen in FIG. 16, the link portions are joined together by intermediate sections 86 which form a continuation of the teeth 40a. The link portions are also interconnected by web portions 90 provided between the adjacent link portions.

Figure 17:
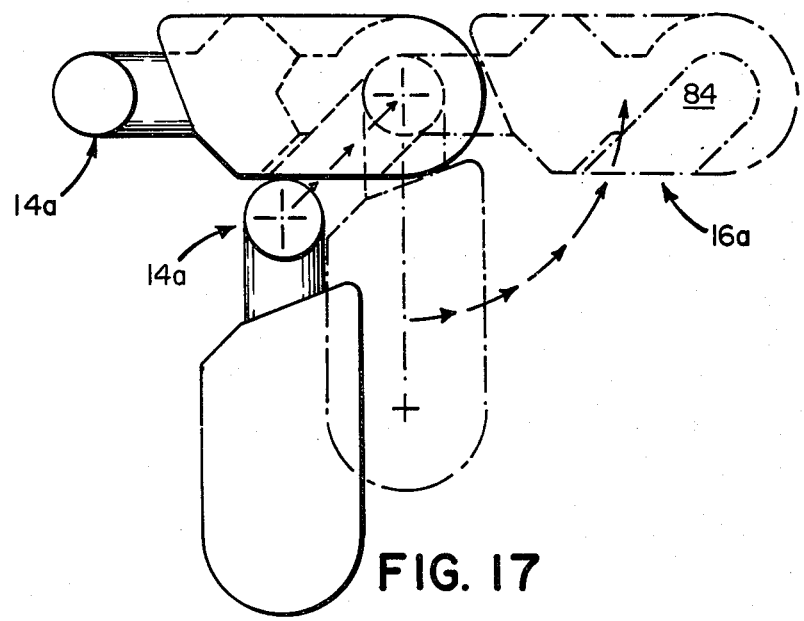
FIG. 17 is an elevation view illustrating the manner of mating of adjacent links.
Figure 18:
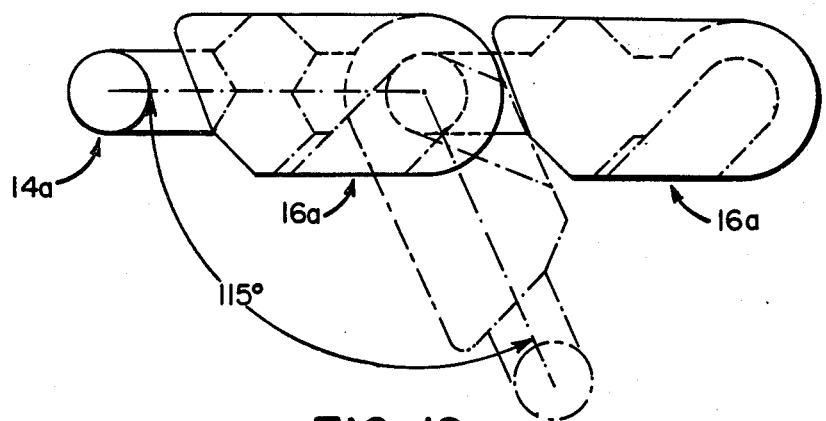
FIG. 18 is an elevation view of a pair of interconnected links illustrating the maximum angular orientation therebetween.

The links are mated with adjacent links by insertion of the post ends 14a into the confronting hook ends 12a of an adjacent link, as illustrated in FIG. 17. With one link generally perpendicular to the other link, the post ends 14a are guided into the recesses 84 of the respective hook ends, and the link is then pivoted into colinear arrangement with the mated link. Thus, the links are readily interconnected by sliding the post end of a first link into the confronting hook end of a second link and then rotating the links into position. Detachment of the links is accomplished by the reverse procedure, namely, downward rotation of one link and sliding removal of the mated ends. The mated links can rotate relative to each other over a substantial extent without disengagement. In the illustrated embodiment, the mated links can have a maximum angular orientation of about 115°, as shown in FIG. 18, before the post ends will begin to disengage from the hook ends.

The link portions of each link are joined together with webs 90 provided between adjacent hook ends, and by webs 86 in alignment between adjacent teeth 40a. As best seen in the bottom view of FIG. 16, the intermediate webs 86 and the teeth 40a form an effectively continuous tooth across the width of the link. The webs each have a surface 94 in alignment with the surfaces 42a. The webs 90 have a beveled surface 96 for added strength. Lateral extensions 21 beyond the link sides can be provided to maintain spacing between laterally adjacent links in an assembled belt, or spacing from support structures.

Figure 22:
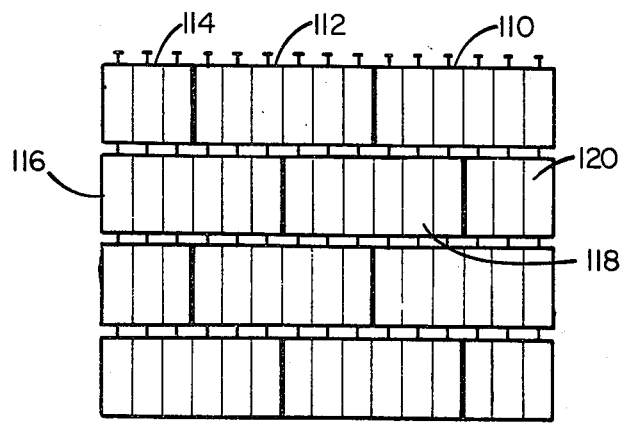
FIG. 22 is a diagrammatic view of a conveyor chain composed of links of different widths.

The conveyor links can be formed of any convenient length and width to suit intended requirements. The conveyor links can be fabricated in multiples of a given width such that a conveyor of an intended overall width can be built up by an array of interleaved links. For example, as shown in FIG. 22, two conveyor links 110 and 112, each having six link portions 113, are laterally adjacent to a link 114 having three link portions. These links are mated to link 116 and 118, each of six link portions, and link 120 of three link portions in an interleaved manner, as illustrated, to provide a wide conveyor belt which retains its lateral rigidity because of the interleaved connection of the multiple width links.

Figure 20:
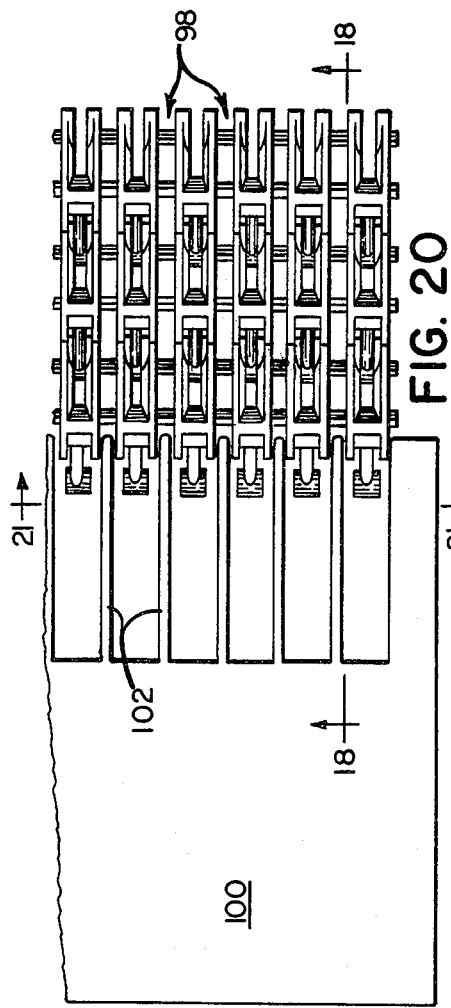
FIG. 20 is a top view of the conveyor link chain and transfer comb of FIG. 19.
Figure 19:
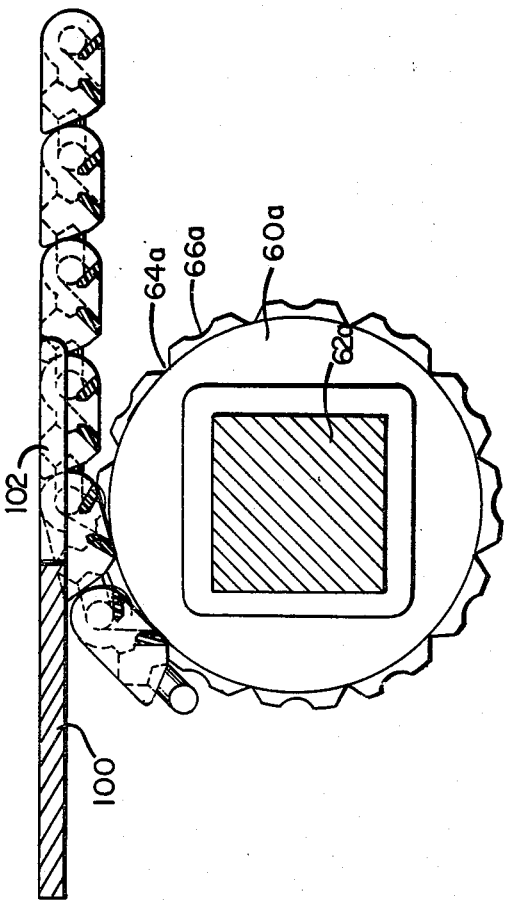
FIG. 19 is an elevation view of the conveyor link chain in engagement with a sprocket wheel and in association with a transfer comb.

The interconnected conveyor links are driven by an associated sprocket wheel as shown in FIGS. 19 and 20, similarly as described above. The sprocket wheel 60a is affixed to a square shaft 62a and includes a plurality of recesses 64a regularly spaced about the periphery of the sprocket wheel and adapted to mate with tooth 34a or 40a. A curved transverse groove 66a is provided in the periphery of the sprocket wheel midway between sprocket recesses 64a to provide clearance for the interconnected link ends. At least two spaced sprocket wheels are employed on a common shaft to drive the conveyor chain. Typically, one sprocket wheel is fixed to its driving shaft, and the other wheel is axially moveable on the shaft to accommodate movement due to thermal expansion and contraction of the links. Additional sprocket wheels can be empolyed across the width of the conveyor link to provide intended driving force. For some purposes, a sprocket wheel can be provided for each link portion of a conveyor link.

Figure 21:
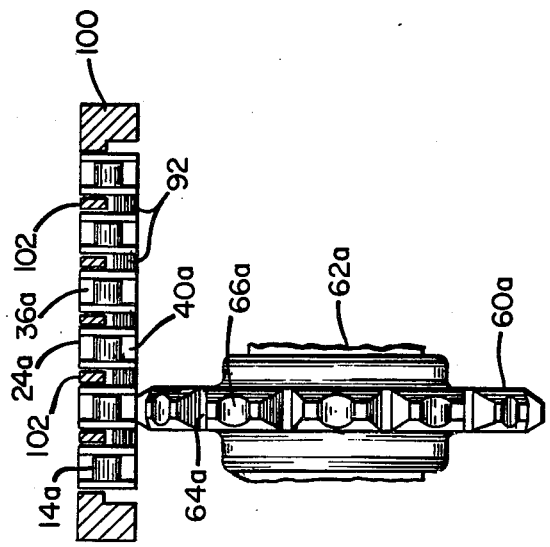
FIG. 21 is an end elevation view of the conveyor link chain, sprocket wheel, and transfer comb of FIG. 19, and taken along line 21—21 of FIG. 20.

As evident from FIG. 20, the interconnected links have longitudinal parallel channels 98, which extend along the length of the interconnected links such that a conveyor transfer comb can be inserted within these channels for transfer of a product onto or off of the conveyor. The comb 100 includes a plurality of parallel fingers 102, each being disposed within a longitudinal channel 98 and with its top surface substantially coplanar with the top surfaces of the links, as shown in FIGS. 19 and 21.

The links of the embodiments described above are each preferably formed as a unitary structure by plastic molding. Any suitable plastic material can be employed which provides the requisite structural and environmental properties for the intended purpose.

The invention is not to be limited to what has been particularly shown and described except as indicated in the appended claims.

What is claimed is:

1. A multiple link chain composed of a plurality of identical links, each comprising:
   a link body having a longitudinal axis, first and second link ends spaced along the axis, first and second longitudinally extending link sides, and first and second link upper and lower sides;
   a pair of cooperative bevelled surfaces on each side of the link body each pair defining a body configuration adapted for mating with a V-pulley;
   the first link end having an integral longitudinally extending arm having an axis coincident with the long axis of the link body, and a cylindrical post centrally disposed on and integral with the free end of the arm with its axis transverse the long axis of the arm, and having first and second post ends outwardly extending from the arm, and defining a first pivot axis orthogonal to the longitudinal axis of the link body;
   the second link end having first and second spaced apart and laterally inwardly extending arcuate walls defining first and second elongated post end receiving slots, said walls integral with corresponding ones of said link sides and integral with said link body, defining therebetween a transversely extending gap, and defining a second pivot axis orthogonal to the longitudinal axis, said first and second arcuate walls are pivotally attachable to the central, transversely extending cylindrical post of an adjacent link for pivotal movement of the attached link about the pivot axis with said first post end received in said first post end receiving slot, and with said second post end received in said second post end receiving slot;
   the links when pivotally engaged having the first pivot axis of one link substantially coincident with the second pivot axis of the adjacent link; and
   a first sprocket tooth transversely extending on the link body and disposed midway between the first and second pivot axes along one of said upper and lower sides of said link body.

2. The multiple link chain of claim 1 wherein each of said links is an integral unitary thermoplastic structure, and further including a second sprocket tooth substantially identical to said first sprocket tooth and provided on the other one of the upper and lower surface of the link body.

3. The multiple link chain of claim 1 wherein the arcuate portions of the second link end include means for retaining the post ends of an adjacent link in pivotable engagement in the arcuate portions, said means including first and second laterally inwardly extending detents in corresponding ones of said first and second arcuate portions to provide abutment surfaces against which the ends of the posts are retained.

4. A multiple link chain composed of a plurality of identical links, each comprising:
   a link body having a central portion extending across the width thereof and joining respective side portions, and an arm outwardly extending from the central portion along the longitudinal axis of the link body beyond the confronting ends of the side portions;
   a "V"-shaped bevelled surface on each side of the link body defining a body configuration adapted for mating with a V-pulley;
   one end of said link body having a post on the outer end of said arm and disposed along a first pivot axis orthogonal to the longitudinal axis and having oppositely extending frist and second cylindrical post ends;
   the other end of said link body having first and second elongated and laterally inwardly extending arcuate hook portions each having elongated opposing arms defining first and second arcuate partially open slots adapted to respectively receive said first and second cylindrical post ends and each fixed to the central portion and to respective sides of the link body, the arcuate hook portions being disposed about a second pivot axis orthogonal to the longitudinal axis and parallel to the first pivot axis;
   the arcuate hook portions of a link being pivotally attachable to the post ends of an adjacent link, the pivotably engaged links having a first pivot axis of one lind substantailly coincident with the second pivot axis of the adjacent links; and
   at least one sprocket extending from the central portion of the link body and disposed between the side portions of the link body and midway between the first and second pivot axes.

5. The multiple link chain of claim 4 wherein each of said links is an integral molded plastic structure.

6. The invention of claim 1, comprising:
   an array of detachable links disposed in parallel along an axis; and
   means joining the detachable links along the axis of the array to provide a rigid unitary structure.

7. A multiple link chain composed of a plurality of identical links, each comprising:
   a link body having a central portion extending across the width thereof and joining respective side portions, and an arm outwardly extending from the central portion along the longitudinal axis of the link body beyond the confronting ends of the side portions;

one end of said link body having a post on the outer end of said arm and disposed along a first pivot axis orthogonal to the longitudinal axis and having oppositely extending first and second cylindrical post ends;

the other end of said link body having first and second elongated laterally and inwardly extending arcuate hook portions integral with corresponding side portions and each having transversely extending elongated opposed arms defining first and second partially open transversely extending elongated slots adapted to respectively receive said first and second cylindrical post ends and each affixed to the central portion and to respective sides of the link body, the arcuate hook portions being disposed about a second pivot axis;

first and second detents provided on corresponding side portions and in corresponding ones of said first and second slots at positions inwardly spaced from the second pivotable axis to provide abutment surfaces against which respective ones of said first and second cylindrical post ends each abut to retain the post ends in the associated slots against motion in a direction out of the the associated slots; and the arcuate hook portions of a link being pivotably attachable to the post ends of an adjacent link, the pivotably engaged links having the first pivot axis of one link substantially coincident with the second pivot axis of the adjacent link.

8. A detachable link for an endless loop belt, comprising:

a body having a central portion and a long axis, first and second spaced apart side walls each having an inside and an outside surface integrally formed with said central portion, and first and second end walls integrally formed with said central portion;

said inside surfaces of said spaced-apart side walls defining therebetween a preselected lateral dimension;

a longitudinally extending arm having a preselected transverse width integrally formed centrally on one end of said central portion;

a transversely extending cylindrical post having a preselected length integrally formed with and centrally disposed on said longitudinally extending arm, said preselected length of said cylindrical post selected to be larger than said preselected transverse width of said longitudinally extending arm to provide first and second free ends; said transversely extending post defining a first pivot axis;

first and second arcuate walls forming first and second post end receiving partially open channels integrally formed with, and laterally and inwardly extending from, the inside surfaces of corresponding ones of said first and second side walls defining therebetween a transversely extending gap having a preselected lateral dimension, said preselected lateral dimension of said transversely extending gap is selected to be no smaller than said transverse width of said longitudinally extending arm integrally formed with said central portion, said first and said second post end receiving channels defining a second pivot axis; and said preselected length of said transversely extending cylindrical post selected to be no larger than said preselected lateral dimension defined between the inside surfaces of said side walls from which corresponding ones of said first and second arcuate walls are laterally and inwardly extending.

9. The multiple chain of claim 8 wherein each of said detachable links is composed of a plurality of said link bodies arranged in laterally spaced relationship and joined to provide a rigid unitary structure.

10. The invention of claim 8 wherein the detachable links are joined together by intermediate sections laterally integrally formed therewith.

11. The invention of claim 8 wherein the detachable links are laterally joined together by central intermediate sections therebetween integral with the detachable links and by lateral web portions in positions remote from the central sections and between adjacent ones of the outside surfaces and integral therewith.

12. The link of claim 8, further including first and second V-shaped surfaces integrally formed on respective ones of said outer surfaces of said first and second side walls for mating with a "V" pulley.

13. The invention of claim 12, further including first and second laterally and inwardly extending detents integrally formed on respective ones of the inside surfaces of said first and second sides at points thereon within corresponding ones of said first and second partially open cylindrical channels and spaced from said second pivot axis for respectively retaining said first and second post ends in said first and second post end receiving partially open channels.

* * * * *

UNITED STATES PATENT AND TRADEMARK OFFICE
CERTIFICATE OF CORRECTION

PATENT NO. : 4,473,365
DATED : September 25, 1984
INVENTOR(S) : James M. Lapeyre It is certified that error appears in the above—identified patent and that said Letters Patent is hereby corrected as shown below:

<u>In the drawings</u>: Figure 16 should include reference numerals 86 and 90

| | | |
|---|---|---|
| Column 3 | Line 9, | "end portion 26" should read --end portions 26-- |
| | Line 34, | "detent 29," should read --detents 29,-- |
| Column 6 | Line 36, | "extending frist" should read --extending first-- |
| | Line 52, | "one lind" should read --one link-- |
| | Line 52, | "substantailly" should read --substantially-- |
| | Line 53, | "adjacent links;" should read --adjacent link-- |

Signed and Sealed this

Nineteenth Day of November 1985

[SEAL]

Attest:

DONALD J. QUIGG

Attesting Officer    Commissioner of Patents and Trademarks